(12) United States Patent
Arata

(10) Patent No.: US 7,104,499 B1
(45) Date of Patent: Sep. 12, 2006

(54) RECHARGEABLE COMPRESSED AIR SYSTEM AND METHOD FOR SUPPLEMENTAL AIRCRAFT THRUST

(75) Inventor: Allen A. Arata, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 262 days.

(21) Appl. No.: 10/255,766

(22) Filed: Sep. 25, 2002

(51) Int. Cl.
*B64D 41/00* (2006.01)

(52) U.S. Cl. .................. 244/58; 244/56; 244/73 R; 244/12.3; 244/17.19

(58) Field of Classification Search .............. 244/53 R, 244/58, 62, 73 R, 12.3, 17.19, 56; 60/200.1, 60/269
See application file for complete search history.

(56) References Cited

U.S. PATENT DOCUMENTS

| | | | |
|---|---|---|---|
| 3,887,146 A | 6/1975 | Bright | 244/12 R |
| 3,887,147 A | 6/1975 | Grieb | 244/42 CC |
| 3,888,435 A * | 6/1975 | Foote | 244/58 |
| 5,039,281 A | 8/1991 | Johnston | 417/212 |
| 5,447,283 A | 9/1995 | Tindell | 244/207 |
| 5,791,601 A | 8/1998 | Dancila et al. | 244/207 |
| 5,992,792 A | 11/1999 | Arnason | 244/13 |

FOREIGN PATENT DOCUMENTS

| | | |
|---|---|---|
| EP | 1 035 016 A1 | 9/2000 |
| WO | WO 85/04149 | 9/1985 |

OTHER PUBLICATIONS

Two (2) photographs illustrating the use of solid rocket fuel boosters to aid in controlling aircraft (1 pg.), Sep. 24, 2001.

* cited by examiner

*Primary Examiner*—J. Woodrow Eldred
(74) *Attorney, Agent, or Firm*—Fulbright&JaworskiLLP

(57) ABSTRACT

A system for providing aircraft thrust includes a compressor, operable to take in a quantity of air, reduce the volume of the air to generate compressed air, and to deliver the compressed air to a tank. The tank is coupled to the compressor and is operable to receive the compressed air, store the compressed air, and deliver the compressed air to a nozzle mounted externally to the aircraft. The nozzle is operable to receive the compressed air and discharge the compressed air to provide thrust for the aircraft.

3 Claims, 6 Drawing Sheets

RECHARGEABLE COMPRESSED AIR SYSTEM AND METHOD FOR SUPPLEMENTAL AIRCRAFT THRUST

TECHNICAL FIELD

This invention relates in general to the field of aircraft propulsion and, more particularly, to a rechargeable compressed air system and method for supplemental aircraft thrust.

BACKGROUND

Aircrafts require lift to achieve flight. Fixed-wing aircraft generate lift by moving the entire craft through the air, creating a pressure differential across the wings. Rotary-wing aircraft generate lift by rotating the wings, also creating a pressure differential across the wings. To achieve lift-off, enough lift must be generated to overcome the weight of the aircraft.

To reduce reliance on long runways, military aircraft have used solid or liquid fuel rocket cartridges such as rocket-assisted take-off (RATO) or jet-assisted take-off (JATO). These cartridges are fixed to the aircraft and provide a temporary boost of thrust during take-off or landing.

SUMMARY

The present invention provides an improved method and system for generating supplemental thrust in an aircraft. In a particular embodiment, compressed air is used to generate thrust and a rechargeable tank allows for repeated use of the compressed air.

In accordance with one embodiment of the present invention, a system for providing aircraft thrust includes a compressor, operable to take in a quantity of air, reduce the volume of the air to generate compressed air, and to deliver the compressed air to a tank. The tank is coupled to the compressor and is operable to receive the compressed air, store the compressed air, and deliver the compressed air to a nozzle mounted externally to the aircraft. The nozzle is operable to receive the compressed air and discharge the compressed air to provide thrust for the aircraft.

More specifically, in accordance with a particular embodiment of the present invention, a controller may be provided, coupled to the compressor and the tank, and operable to direct the compressor to generate compressed air and deliver the compressed air to the tank, and further operable to direct the tank to deliver compressed air to the nozzle. The controller may also orient the nozzle to control the direction of thrust.

Technical advantages of the present invention include providing an improved method and system for providing supplemental aircraft thrust. In a particular embodiment, a rechargeable system and method for supplemental aircraft thrust is provided. Air may be compressed, stored, and discharged to provide thrust on demand. In this way, additional thrust may be provided for take-off, landing, as well as in flight.

Still another technical advantage of one or more embodiments of the present invention includes providing a method and system for directing thrust on demand. In a particular embodiment, air may be compressed, stored, and discharged through nozzles that may be directed to provide thrust in a particular direction. In this way, a wide variety of maneuvers may be performed, such as short take-offs, short landings, mid-air maneuvers or compensation, accident avoidance, and high speed flight.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION

Figure 1:
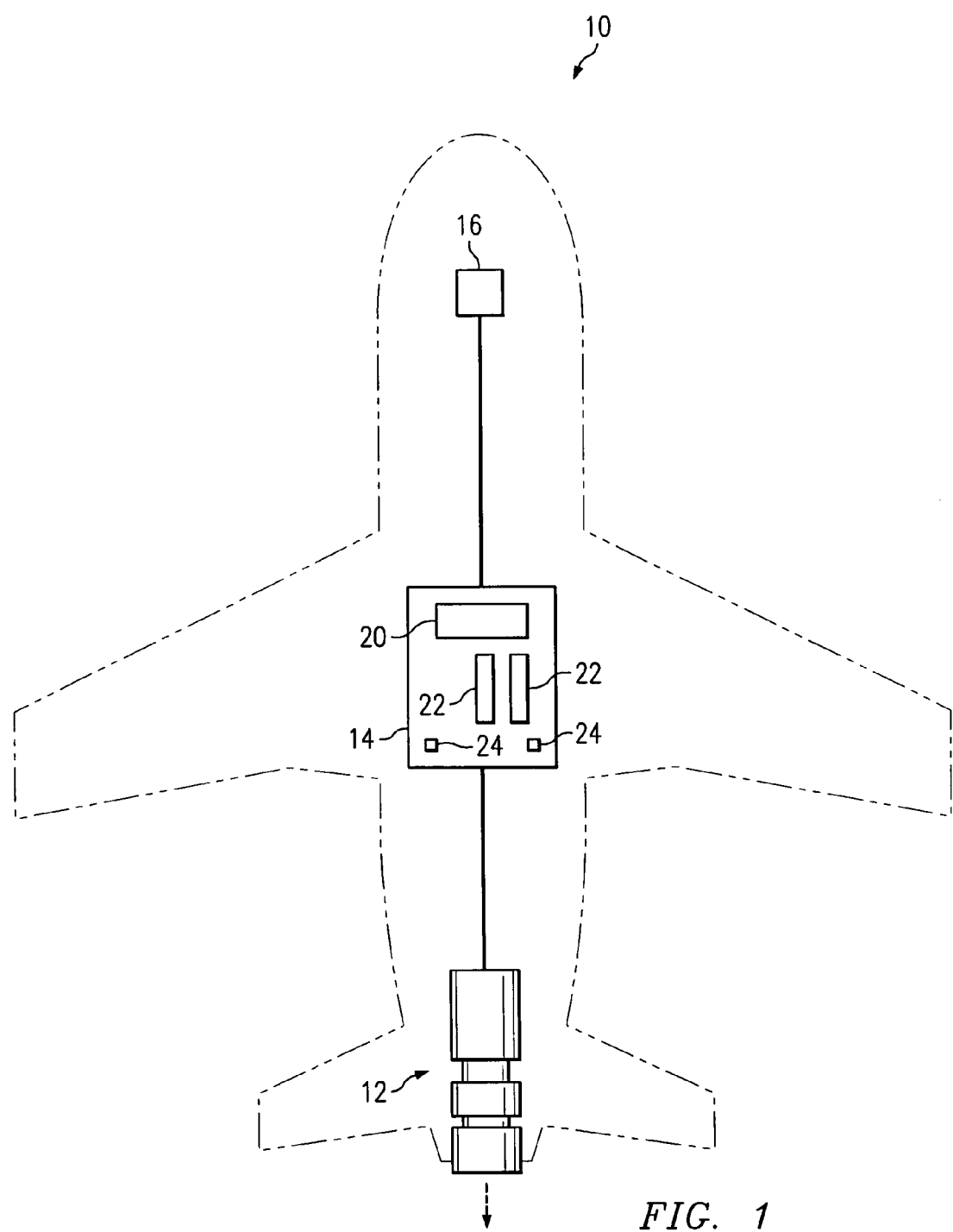
FIG. 1 is a block diagram illustrating a fixed-wing aircraft configured with a rechargeable thrust module in accordance with one embodiment of the present invention.

FIG. 1 is a block diagram illustrating an aircraft 10 in accordance with one embodiment of the present invention. In this embodiment, aircraft 10 is a fixed-wing aircraft with a jet engine 12. Aircraft 10 may be any type of fixed-wing or other suitable aircraft and may include one or more jet or other suitable engines 12 in a variety of configurations. In the illustrated embodiment, aircraft 10 includes a single jet engine 12 located at the aft end of the aircraft.

Referring to FIG. 1, aircraft 10 includes a jet engine 12, a rechargeable thrust module 14, and a control unit 16. Jet engine 12 may be any type of jet engine suitable to generate thrust and propel aircraft 10 through the atmosphere. Jet engine 12 may be a gas turbine engine or otherwise suitably constructed.

Rechargeable module 14 is operable to receive, compress, store, and discharge air to provide supplemental and rechargeable thrust for the aircraft. In one embodiment, rechargeable module 14 includes a compressor 20, one or more tanks 22 and one or more nozzles 24 mounted to the aircraft 10. An element is mounted to the aircraft when it is attached, connected or otherwise coupled to a part of the aircraft. Compressor 20 is operable to intake a quantity of air, reduce the volume of the air to generate compressed air, deliver the compressed air to the tanks 22, and receive control signals from control unit 16. Compressor 20 may comprise any compressor suitable for use on an aircraft. Tanks 22 are operable to receive compressed air, store compressed air, and deliver compressed air to the nozzles 24. Tanks 22 may be spherical, oblong, cylindrical, flattened spherical, or otherwise suitably constructed to meet space requirements on the aircraft and volume of compressed air stored and any other criteria as required by the aircraft environment.

Additionally, in some embodiments, each tank 22 may be coupled to a dedicated compressor 20, or each compressor 20 may be coupled to a subset of the total number of tanks 22 of rechargeable module 14. Moreover, compressors 20 may receive air from an air intake. The air intake may be a dedicated atmospheric air intake, an intake from an aircraft engine, such as a bleed air intake or component intake, other suitable structure, or a combination of the above operable to provide air to compressors 20. As used herein, each means all of at least a subset of the members of a group.

Nozzles 24 are operable to receive compressed air from tanks 22 and to discharge the compressed air into the atmosphere. Nozzles 24 may comprise a convergent nozzle, a convergent-divergent nozzle, or otherwise suitably constructed to deliver air at a high pressure to generate or otherwise provide thrust. As described in more detail below, the nozzles 24 may be attached to the outer surfaces of the aircraft or otherwise suitable positioned. The nozzles 24 may be positioned in-flight to control the resultant direction of thrust. Thus, nozzles 24 may be positioned to direct thrust aftwards on take-off and forwards on landing to reduce taxi and runway requirements.

Control unit 16 controls compressor 20, tanks 22, nozzles 24 and other elements of rechargeable thrust module 14. Control unit 16 may activate compressor 20 when tanks 22 are below a threshold pressure, control pressure in tanks 22, regulate and control discharge of tanks 22, and/or control the position and setting of nozzles 24. Control unit 16 may comprise hardware, software, logic encoded in media, or be otherwise suitably constructed. The logic comprises functional instructions for carrying out program tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized. Control unit 16 is operable to receive instructions from a user and to generate control signals to direct operation of rechargeable thrust module 14.

Figure 2:
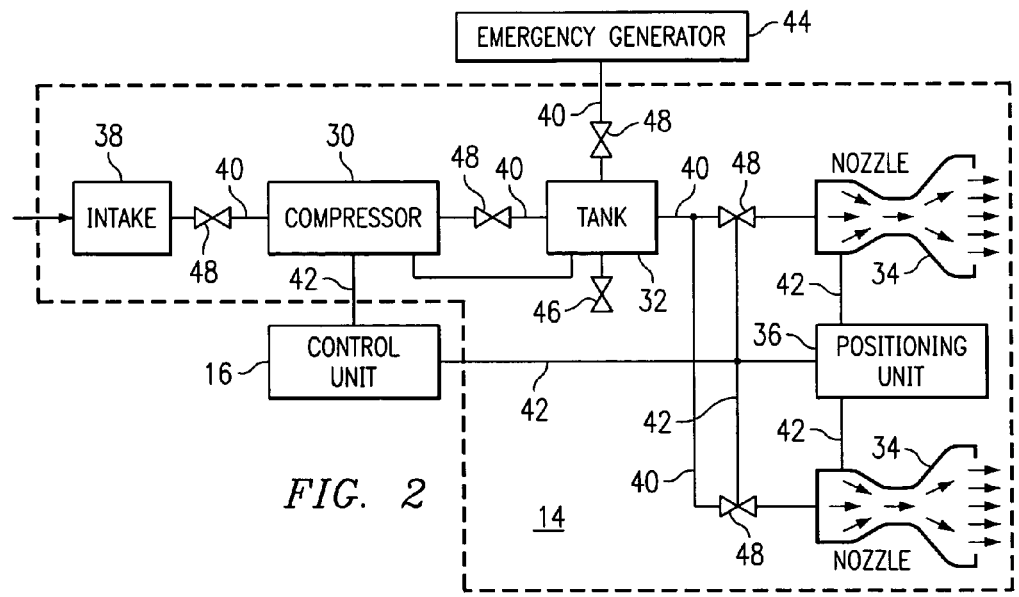
FIG. 2 is a block diagram illustrating details of the rechargeable thrust module of FIG. 1 in accordance with one embodiment of the present invention.

FIG. 2 is a block diagram illustrating additional details of the rechargeable thrust module 14 of FIG. 1 in accordance with one embodiment of the present invention. In this embodiment, a single compressor and tank is shared by a plurality of nozzles. Other embodiments may comprise separate tanks and compressors for each nozzle or a subset of nozzles.

Referring to FIG. 2, a rechargeable thrust module 14 includes a compressor 30, a compressed air tank 32, nozzles 34, a positioning unit 36, and an intake 38. Intake 38 is coupled to compressor 30 by an air link 40 and is operable to receive air and deliver a quantity of air to compressor 30 along air link 40. Intake 38 may be a vent with a scoop, drawing air from the atmosphere, or may be a bleed air system drawing air from an engine, or otherwise suitably constructed.

Compressor 30 is coupled to tank 32 by an air link 40 and is connected or otherwise coupled to control unit 16 by a control link 42. Compressor 30 is operable to receive a quantity of air from intake 38, to reduce the volume of the quantity of air received to generate compressed air, deliver the compressed air to tank 32 along air link 40, and to receive control signals from control unit 16 along control link 42. In some embodiments compressor 30 may be coupled to more than one tank 32. In those embodiments, control unit 16 may direct compressor 30, through the manipulation of valves, to provide compressed air to one, some, or all of the more than one tank 32. Thus, each of the more than one tank 32 may be charged separately or simultaneously with other tanks 32 coupled to compressor 30. In another embodiment, the compressor may automatically charge the tank or tanks when their pressure falls below a specified limit.

In one embodiment, compressor 30 may be a twenty (20) horsepower compressor, operable to charge tank 32 at a rate of twenty-five (25) cubic feet per minute. In another embodiment, compressor 30 is a sixty (60) horsepower compressor, operable to charge tank 32 at a rate of eighty (80) cubic feet per minute. As used herein, charge means to deliver compressed air. It will be understood that other compressors suitable for use in an aircraft may also be used. For example, in one embodiment, charged compressed air pressure may be five thousand pounds per square inch.

Tank 32 is coupled to nozzles 34 by air link 40. In the illustrated embodiment, tank 32 is also coupled to an emergency generator 44 via an air link 40. In one embodiment, air links 40 coupling compressor 30 to tank 32 and coupling tank 32 to nozzles 34 may comprise a regulator hose, flexible tubing, or other suitable link. Tank 32 is operable to receive compressed air from compressor 30, store the compressed air and deliver the compressed air to nozzles 34 and/or emergency generator 44 as required. In one embodiment, tank 32 may be a 0.64 cubic feet, 33 pound, 3,500 pounds per square inch tank, operable to store approximately 100 cubic feet of compressed air. In this embodiment, tank 32 may be employed on a rotary-wing aircraft.

Tank 32 also includes a relief valve 46 operable to discharge compressed air from tank 32 in the event that the pressure inside tank 32 exceeds a certain predetermined amount. Emergency generator 44 is operable to receive compressed air from tank 32 and to generate electricity based on the compressed air. Electricity generated by emergency generated 44 may be used to restore electrical power to the aircraft to provide emergency power in the event of an engine failure or other emergency whereby the ordinary electrical generation mechanisms have failed.

Nozzles 34 are coupled to tank 32 via air links 40 and coupled to positioning unit 36 via control links 42. In the illustrated embodiment, nozzles 34 are convergent-divergent type nozzles, but other suitable types of nozzles, such as, for example, a convergent nozzle, may also be employed.

Positioning unit 36 is coupled to control unit 16 via control link 42 and is operable to control the orientation of nozzles 34 with respect to the aircraft in which rechargeable thrust module 14 is employed. Functionality of the positioning unit may be distributed with each nozzle or groups of nozzles being separately and independently positioned. Thus, for example, positioning unit 36 may orient nozzles 34 so as to provide purely horizontal thrust in the forward direction, or may orient nozzles 34 to provide purely reversed thrust in the aft direction or other suitably-directed thrust. Positioning unit 36 may also orient nozzles 34 so as to provide additional lift in flight, to counter a downdraft, or may orient nozzles 34 to provide stabilization or assistance thrust to improve aerodynamic performance during emergency collision avoidance, emergency flight recovery such as flat spin recovery, or other rapid maneuvers. Accordingly, nozzles 34 may have different settings to provide variable-direction thrust. Moreover, while the illustrated embodiment shows two nozzles 34, rechargeable thrust module 14 may comprise other numbers of nozzles 34, such as one nozzle, three nozzles, or any other suitable number of nozzles.

Additionally, nozzles 34 may have default settings based on the status of the aircraft. For example, nozzles 34 may have a default setting to provide additional lift to assist take-off when the aircraft is in standby to take-off. Alternatively, nozzles 34 may have a default setting to provide landing assistance when the aircraft is preparing to land. Other suitable default settings may also be provided based on the flight requirements of the aircraft.

Rechargeable thrust module 14 also includes a plurality of valves 48 located along air links 40 and operable to control the flow of air between components. For example, when the valve 48 situated between intake 38 and compressor 30 is open, the compressor 30 may receive air along air link 40 from intake 38. Similarly, a valve 48 controls delivery of air from compressor 30 to tank 32, from tank 32 to nozzle 34, and from tank 32 to emergency generator 44. In one embodiment, valves 48 are controlled by control unit 16 via control links 42 (not shown). The functionality of control unit 16 may be distributed in the module 24 and aircraft 10. For example, part of the control system may be part of the aircraft control and flight system.

In operation, intake 38 receives a quantity of air and delivers the air along air link 40 to compressor 30. In one embodiment intake 38 may collect the air from the atmosphere using a vent and scoop. In another embodiment, intake 38 may collect bleed air from the aircraft engine in which the rechargeable thrust module 14 is employed. Compressor 30 receives a quantity of air from intake 38 and reduces the volume of the air to produce compressed air. Control unit 16 directs compressor 30 via control link 42 to begin reducing the volume of air and also controls the valve 48 between compressor 30 and tank 32. Upon direction from control unit 16, compressor 30 delivers the compressed air to tank 32. Tank 32 stores the compressed air until such time as control unit 16 activates one of the valves 48 directing the air either to nozzle 34 or emergency generator 44. Where control unit 16 opens the valve 48 to nozzle 34, tank 32 delivers the compressed air to nozzle 34, which releases or discharges the compressed air into the atmosphere in a direction as dictated by the orientation of nozzle 34, as controlled by positioning unit 36. The action of releasing the compressed air into the atmosphere, by virtue of the design of nozzle 34, generates thrust which propels the aircraft in a direction opposite from where nozzle 34 is directed or pointed.

Figure 3:
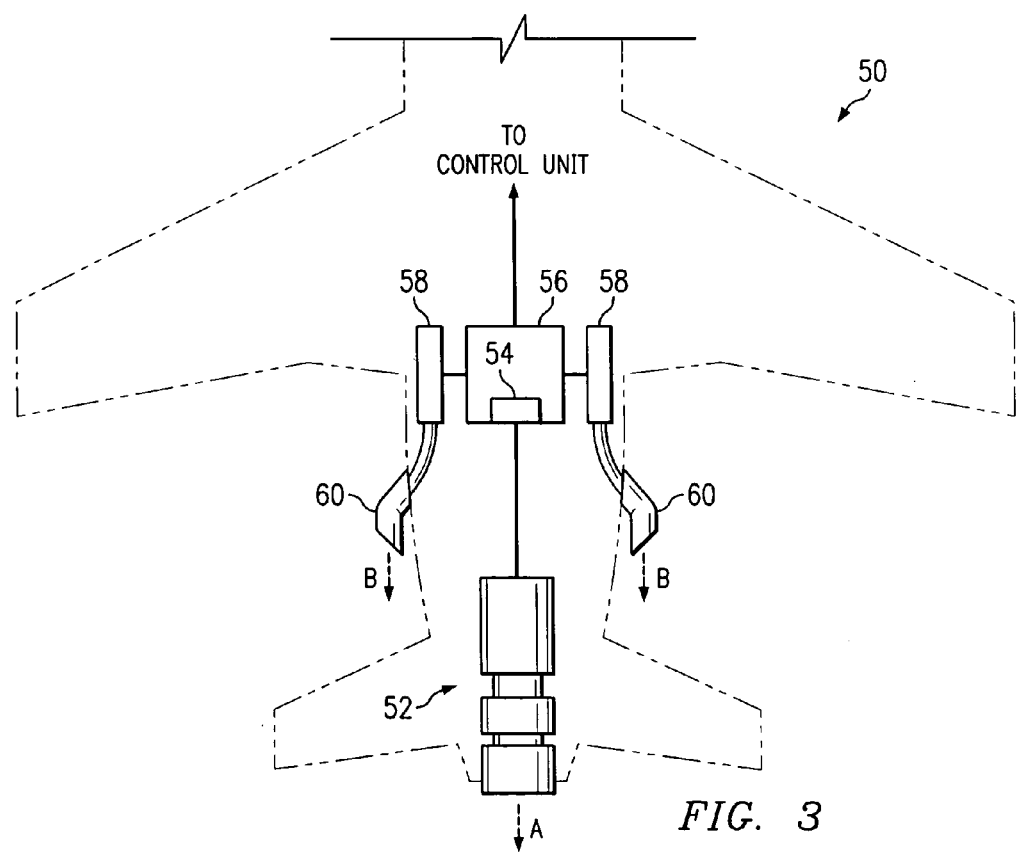
FIG. 3 is a block diagram illustrating a partial view of a fixed-wing aircraft configured with the rechargeable thrust module in accordance with another embodiment of the present invention.

FIG. 3 illustrates an aircraft 50 configured with a rechargeable thrust module in accordance with another embodiment of the present invention. In this embodiment, aircraft 50, only a portion of which is shown, is configured with a single engine 52 which delivers bleed air to intake 54 of compressor 56 on airlink 55. In this embodiment, compressor 56 delivers compressed air to two tanks 58, located inside the fuselage of aircraft 50. In the illustrated embodiment, each tank 58 delivers compressed air to a single nozzle 60. As shown, engine 52 provides thrust to aircraft 50 generally in the direction indicated by arrow A. In the illustrated embodiment, nozzles 60 are oriented so as to provide thrust in the direction indicated by arrows B.

Nozzles 60 may also be oriented to provide braking thrust in a direction generally opposite that indicated by arrows B, to assist in landing. Additionally, in some embodiments only one tank 58 may be provided to deliver compressed air to both nozzles 60.

Figure 4:
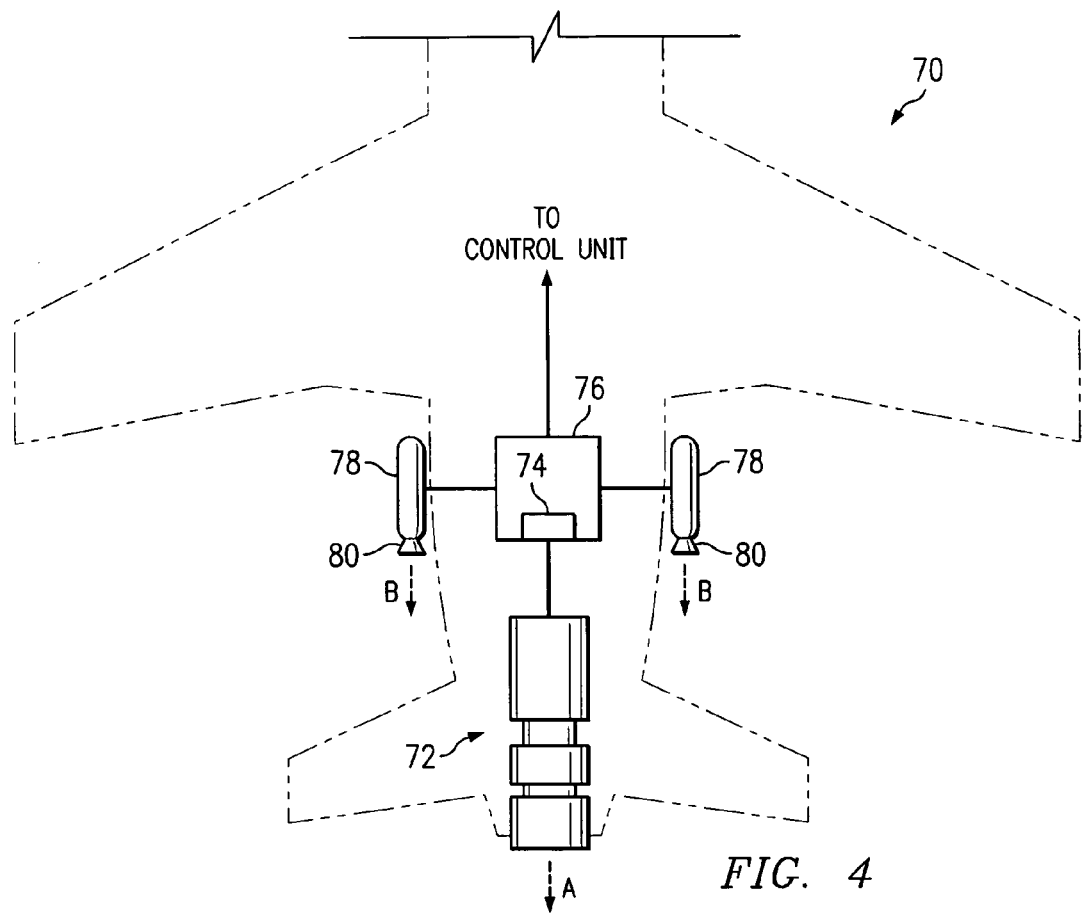
FIG. 4 is a block diagram illustrating a partial view of a fixed-wing aircraft configured with a rechargeable thrust module in accordance with another embodiment of the present invention.

FIG. 4 illustrates an aircraft 70 configured with a rechargeable thrust module in accordance with another embodiment of the present invention. In this embodiment, aircraft 70, only a portion of which is shown, is configured with a single engine 72 which delivers bleed air to intake 74 of compressor 76. In this embodiment, compressor 76 delivers compressed air to two tanks 78, located outside the fuselage of aircraft 70. In the illustrated embodiment, each tank 78 delivers compressed air to a single nozzle 80. As shown, engine 72 provides thrust to aircraft 70 generally in the direction indicated by arrow A. In the illustrated embodiment, nozzles 80 are oriented so as to provide thrust in the direction indicated by arrows B. In the illustrated embodiment, because tanks 78 are located external to the fuselage of aircraft 70, they are shown in a cylindrical or oblong configuration. It will be understood that other suitable configurations may be employed so as to reduce the drag on airplane 70 created by the tanks 78. Moreover, in some embodiments, a nozzle 80 is fixed to a tank 78 and may be oriented by rotating tank 78. In this embodiment, tanks 78 are rotably mounted to the fuselage of aircraft 70 and are oriented via command signals from a control unit (not shown).

Figure 5:
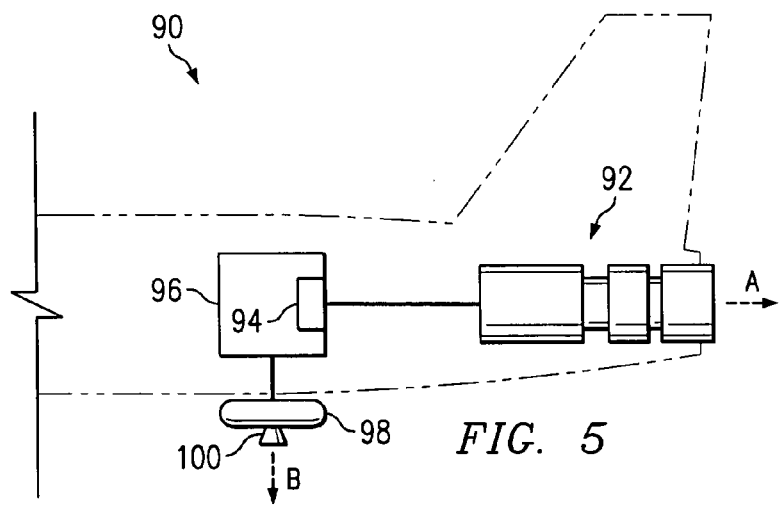
FIG. 5 is a block diagram illustrating a fixed-wing aircraft configured with a rechargeable thrust module in accordance with another embodiment of the present invention.

FIG. 5 illustrates an aircraft 90 configured with a rechargeable thrust module in accordance with another embodiment of the present invention. In this embodiment, aircraft 90 is configured with a single engine 92 which delivers bleed air to intake 94 of compressor 96. In this embodiment, compressor 96 delivers compressed air to tank 98, located outside the fuselage of aircraft 90. In the illustrated embodiment, tank 98 delivers compressed air to a single nozzle 100. As shown, engine 92 provides thrust to aircraft 90 generally in the direction indicated by arrow A. In the illustrated embodiment, nozzle 100 is oriented so as to provide thrust in the direction indicated by arrow B. In the illustrated embodiment, because tank 98 is located external to the fuselage of aircraft 90, it is shown in a cylindrical or oblong configuration. It will be understood that other configurations may be employed so as to reduce the drag on airplane 90 created by tank 98. As shown, engine 92 generates thrust to aircraft 90 in the direction as indicated by arrow A, while the orientation of nozzle 100 generates thrust in the direction indicated by arrow B. In this embodiment the rechargeable thrust module may be used to assist in takeoff in a vertical manner or to otherwise reduce the runway length needed to achieve liftoff of aircraft 90. In some embodiments, nozzle 100 may be oriented at an angle aftwards away from the vertical to provide more forward-driven take-off assistance.

Figure 6:
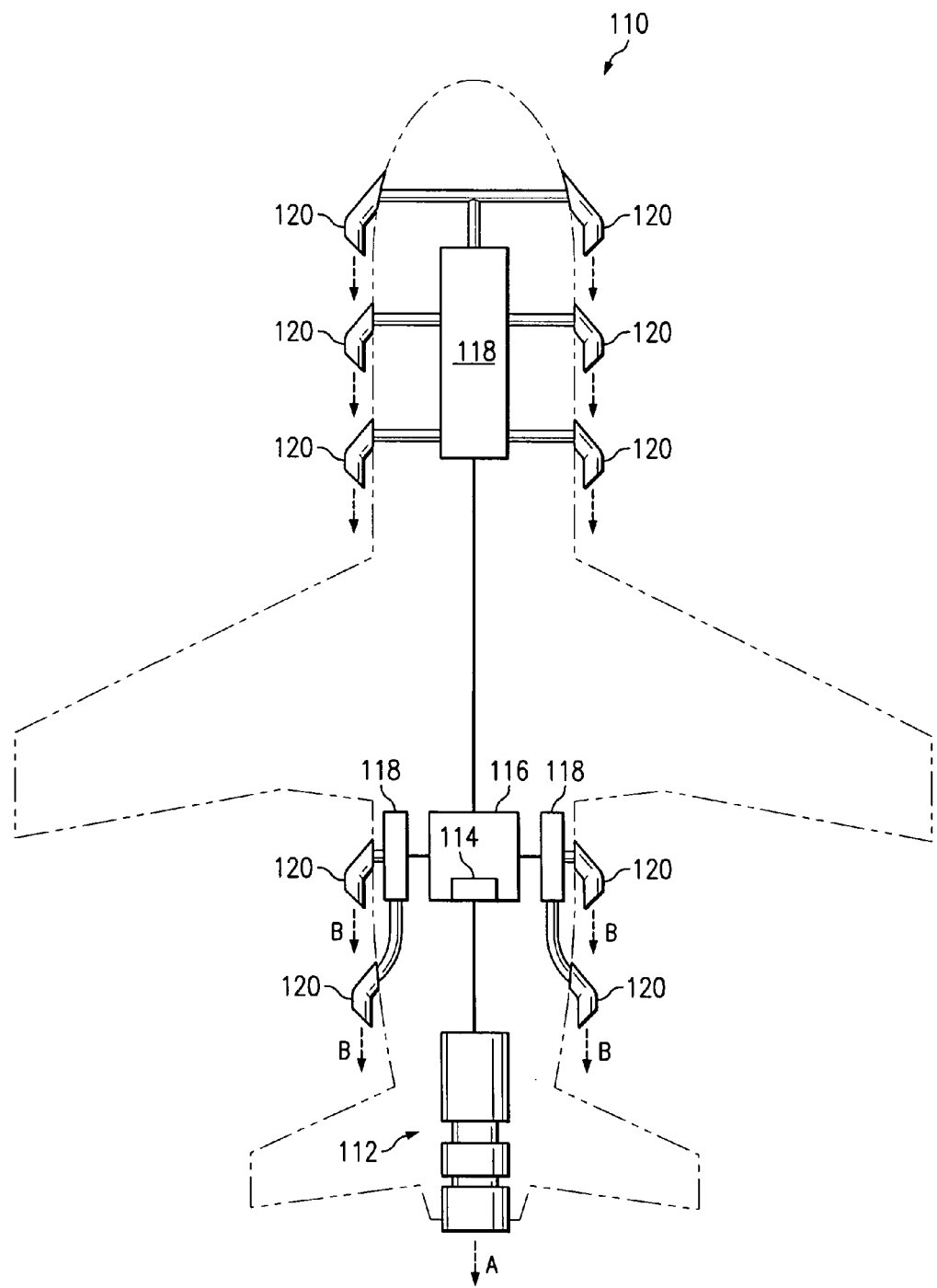
FIG. 6 is a block diagram illustrating a fixed-wing aircraft configured with a rechargeable thrust module in accordance with another embodiment of the present invention.

FIG. 6 illustrates an aircraft 110 configured with a rechargeable thrust module in accordance with another embodiment of the present invention. In this embodiment, aircraft 110 is configured with a single engine 112, which delivers bleed air to intake 114 of compressor 116. In this embodiment, compressor 116 delivers compressed air to three tanks 118, located inside the fuselage of aircraft 110. In the illustrated embodiment, each tank 118 delivers compressed air to a plurality of nozzles 120. As shown, a forward tank 118 provides compressed air to a forward set of nozzles 120 to provide forward thrusters, and an aft set of tanks 118 provide compressed air to an aft set of nozzles 120 to provide aft thrusters. As shown, engine 112 provides thrust to aircraft 110 generally in the direction indicated by arrow A. In the illustrated embodiment, nozzles 120 are oriented so as to provide thrust in the direction indicated by arrows B.

Both sets of thrusters, fore and aft, may be oriented independently based on the needs of aircraft 110. For example, if aircraft 110 experiences a sudden drop in altitude, such as might be caused by a downdraft, both sets of nozzles may be oriented vertically to assist in countering the effects of the downdraft. Alternatively, the forward thrusters may be oriented vertically and aftwards, while the aft thrusters are oriented vertically and forwards to modify the amount of upward thrust delivered to aircraft 110. The thrusters may also be oriented to assist in pulling out of a dive by orienting the forward thrusters aftwards and towards the bottom of the aircraft and the aft thrusters forward and toward the top of the aircraft. Similarly, the thrusters may be oriented to assist in coming out of a climb by orienting the forward thrusters forwards and towards the top of the aircraft and the aft thrusters aftwards and towards the bottom of the aircraft. The thrusters may also be oriented to assist in pulling out of a flat spin, by orienting the thrusters so as to counter the rotation in the spin direction. Other suitable orientations may also be achieved to provide improved flight performance of aircraft 110, such as sharper turns and improved maneuverability.

A control unit may provide manual or automatic orientation of nozzles 120. For example, control unit may be configured to allow complete pilot control of nozzles 120 and/or automatically orient nozzles 120 in response to predetermined emgergency situations such as a flat spin or pilot incapacitation or routine situations such as take-off and landing. Thus a control unit may provide additional safety measures for aircraft 110. In addition, one or more of the nozzles may be used during normal in-flight operations.

Figure 7:
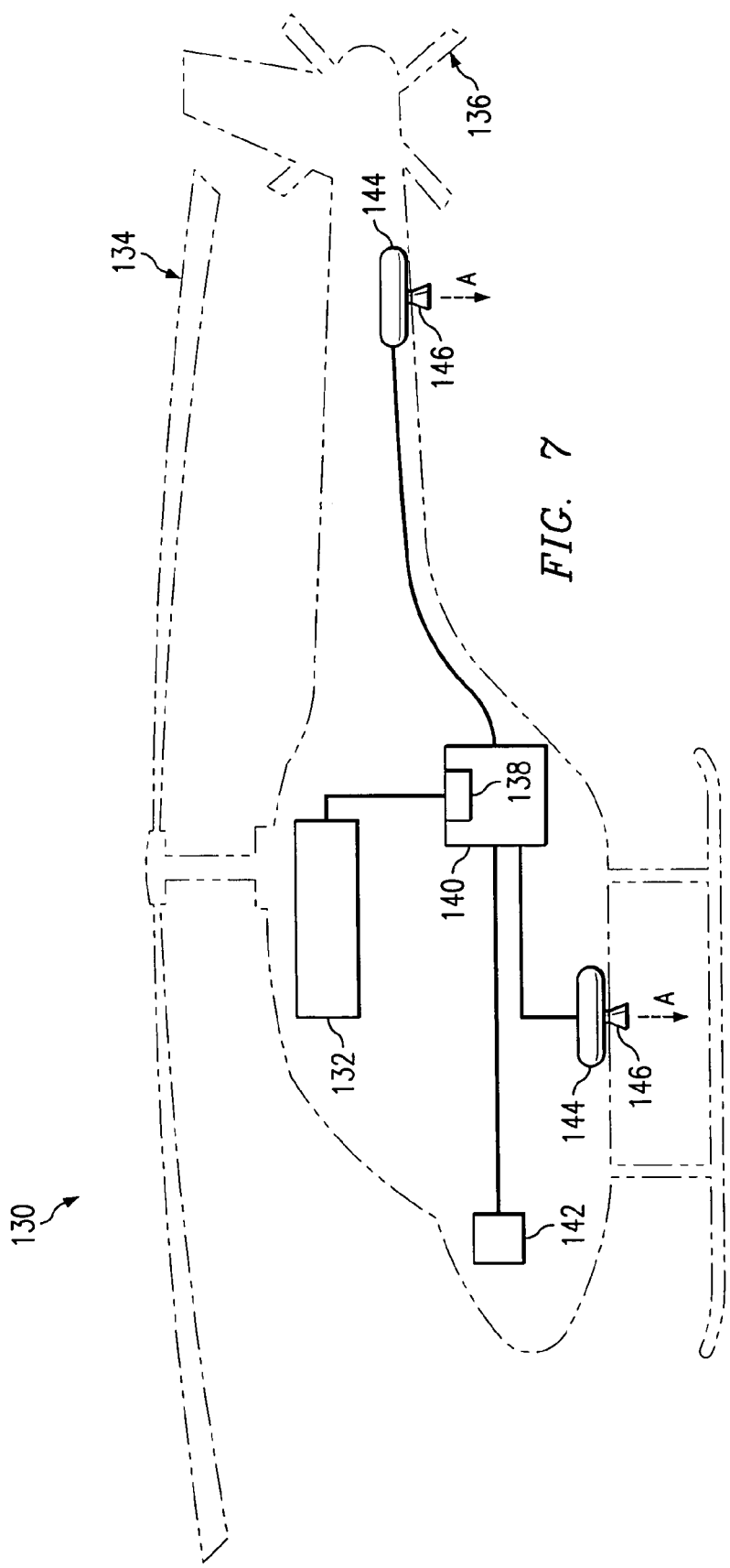
FIG. 7 is a block diagram illustrating a rotary-wing aircraft configured with a rechargeable thrust module in accordance with one embodiment of the present invention.

FIG. 7 illustrates an aircraft 130 configured with a rechargeable thrust module in accordance with another embodiment of the present invention. In this embodiment aircraft 130 is a rotary-wing aircraft. In this embodiment engine 132 is operable to rotate main blades 134 and aft blades 136. In the illustrated embodiment, engine 132 delivers bleed air to intake 138, which delivers air to compressor 140. Control unit 142 directs the delivery of compressed air from compressor 140 to tanks 144. Control unit 142 also directs the delivery of compressed air from tanks 144 to their associated nozzles 146. As illustrated, nozzles 146 are oriented so as to discharge compressed air and generate lift in the direction indicated by arrows A. In an alternative embodiment, one or more nozzles 146 may be mounted on the side of aircraft 130 for controlling the aircraft during flight operations such as dives, climbs or other suitable operations where additional thrust may be desired.

Figure 8:
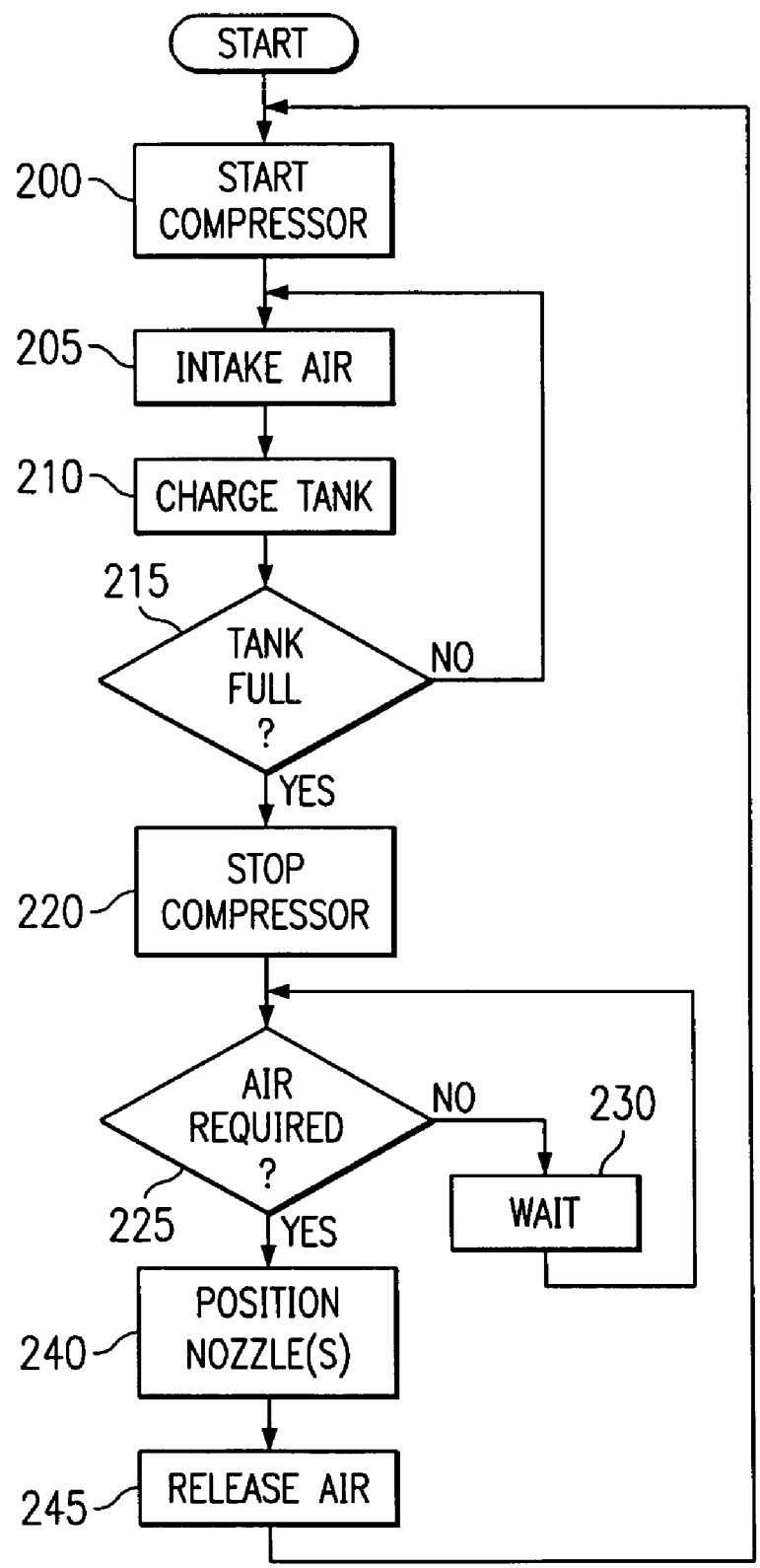
FIG. 8 is a flow diagram illustrating a method for providing thrust in accordance with one embodiment of the present invention.

FIG. 8 is a flow diagram illustrating a method for generating rechargeable supplemental thrust on an aircraft in accordance with one embodiment of the present invention. The process begins at step 200 wherein the control unit directs the compressor to begin receiving air from the intake and reducing the volume of the received air to charge the tanks with compressed air. Next, at step 205, the compressor receives air from the intake and at step 210 the compressor reduces the volume of air to produce compressed air and delivers the compressed air to the tank. At decisional step 215, a determination is made whether the tank is full, or has otherwise reached its maximum capacity to store compressed air. If the tank is not full, the process proceeds along the No branch of decisional step 215 and returns to step 205 wherein the compressor intakes additional air, compresses the volume of the air, and delivers it to the tank. If the tank is full, the process continues along the Yes branch of decisional step 215 to step 220 wherein the compressor is stopped or otherwise put in idle mode.

Next, at decisional step 225, a determination is made whether the compressed air is required. The compressed air, as described above, may be required to power an emergency generator, or may be required to provide thrust for the aircraft on which this system is employed. If the air is not required, the process proceeds along the No branch to step 230 wherein the system idles and the tank continues to store the compressed air. After step 230 the process returns to step 225 wherein again a determination is made whether the compressed air is required. If the compressed air is required, the process proceeds along the Yes branch to step 240.

Next, at step 240 the nozzles are positioned to provide the desired thrust. The process continues to step 245 wherein the compressed air is delivered to the nozzle for discharge by the storage tank. When the air has been discharged or is being discharged, the process returns to step 200 wherein the compressor is taken out of idle state and again begins to recharge the tank. It will be understood that the compressor may operate to automatically recharge the tanks after discharge, recharge the tanks after a threshold reduction in tank pressure is achieved, or may recharge the tanks only after a charge command, or may be otherwise suitably configured.

Although the method of FIG. 8 has been shown with specific steps in a specific order, it will be understood that the steps may be performed in a different order as appropriate and other steps may be added or omitted as appropriate and in keeping with the spirit of the present invention.

Although the present invention has been described with several embodiments, various changes and modifications may be suggested to one skilled in the art. It is intended that the present invention encompass such changes and modifications as fall within the scope of the appended claims.

What is claimed is:

1. A system for rechargeable compressed air supplemental thrust for an aircraft, comprising:

an air intake, operable to receive air from the atmosphere and deliver the received air to a compressor;

a first valve coupled to the air intake and operable to regulate the delivery of air from the air intake to the compressor based on control signals from a control unit;

the compressor coupled to the first valve and operable to reduce the volume of air received from the air intake to generate compressed air for delivery to a tank based on control signals from the control unit;

a second valve coupled to the compressor and operable to regulate delivery of compressed air from the compressor to the tank based on control signals from the control unit;

the tank coupled to the second valve and operable to receive the compressed air from the compressor and store the compressed air;

a third valve coupled to the tank and operable to regulate the delivery of air from the tank to a first nozzle based on control signals from the control unit;

the first nozzle located off any wing and coupled to the third valve and operable to receive compressed air from the tank, further operable to release the compressed air to the atmosphere to provide thrust for the aircraft in a first direction;

a fourth valve coupled to the tank and operable to regulate the delivery of air from the tank to a second nozzle;

the second nozzle located off any wing and coupled to the fourth valve and operable to receive compressed air from the tank, further operable to release the compressed air to the atmosphere to provide thrust in a second direction; and a positioning unit coupled to the first and second nozzles and operable to position the nozzles in the first and second directions based on control signals from the control unit.

2. The system of claim 1, wherein the first and second directions are the same.

3. The system of claim 1, wherein the first and second directions are different.

* * * * *